(12) United States Patent
Kepley, Jr.

(10) Patent No.: US 8,693,093 B2
(45) Date of Patent: Apr. 8, 2014

(54) PORTABLE PROJECTOR AND SCREEN MOUNTING SYSTEM

(71) Applicant: LeRoy Francis Kepley, Jr., Mineola, TX (US)

(72) Inventor: LeRoy Francis Kepley, Jr., Mineola, TX (US)

( * ) Notice: Subject to any disclaimer, the term of this patent is extended or adjusted under 35 U.S.C. 154(b) by 0 days.

(21) Appl. No.: 13/751,976

(22) Filed: Jan. 28, 2013

(65) Prior Publication Data

US 2013/0194662 A1  Aug. 1, 2013

Related U.S. Application Data

(60) Provisional application No. 61/591,648, filed on Jan. 27, 2012, provisional application No. 61/594,181, filed on Feb. 2, 2012, provisional application No. 61/659,279, filed on Jun. 13, 2012, provisional application No. 61/731,956, filed on Nov. 30, 2012.

(51) Int. Cl.
*G03B 21/56* (2006.01)
*G03B 21/14* (2006.01)

(52) U.S. Cl.
USPC .............................. 359/443; 353/79; 248/918

(58) Field of Classification Search
USPC .................... 359/443; 353/79; 248/917–924
See application file for complete search history.

(56) References Cited

U.S. PATENT DOCUMENTS

| 6,736,516 B1 * | 5/2004 | Kepley et al. ................. 359/443 |
| 7,290,888 B2 * | 11/2007 | Kepley et al. ................... 353/79 |
| 7,537,184 B1 * | 5/2009 | Basilicato et al. ........ 248/123.11 |
| 8,267,527 B2 * | 9/2012 | Kepley, Jr. ....................... 353/79 |

* cited by examiner

*Primary Examiner* — Christopher Mahoney
(74) *Attorney, Agent, or Firm* — Howison & Arnott, L.L.P.

(57) ABSTRACT

A portable projection screen system includes a foldable structure defining a viewing area. A projector mounting assembly includes first and second mounting arms spaced a selected distance apart. Each of the first and second mounting arms including a horizontal projector member located above the viewing area and extending forward of the viewing area. A vertical projector member pivotally connects to a backside of the viewing area in a plurality of positions. Each of the plurality of positions locates the horizontal projector member at a different height above the viewing area. A projector crossbar member slidably connects and moves between a plurality of positions that are each a different distance from the viewing area.

26 Claims, 14 Drawing Sheets

PORTABLE PROJECTOR AND SCREEN MOUNTING SYSTEM

CROSS-REFERENCE TO RELATED APPLICATIONS

This application claims benefit of U.S. Provisional Patent Application No. 61/591,648, filed Jan. 27, 2012, entitled 2D-3D COLLAPSIBLE PROJECTION SCREEN WITH EDGE BLENDING CAPABILITY, the specification of which is incorporated herein by reference; the present application also claims benefit of U.S. Provisional Patent Application No. 61/594,181, filed Feb. 2, 2012, entitled SCREEN WINGS FOR INCREASING PROJECTION SCREEN WIDTH, the specification of which is incorporated herein by reference; the present application also claims benefit of U.S. Provisional Patent Application No. 61/659,279, filed Jun. 13, 2012, entitled SCREEN SYSTEM, the specification of which is incorporated herein by reference; and the present application also claims benefit of U.S. Provisional Patent Application No. 61/731,956, filed Nov. 30, 2012, entitled SCREEN SYSTEM, the specification of which is incorporated herein by reference.

TECHNICAL FIELD

The present invention relates to projector systems and, more particularly, to a portable projection system for supporting a projector and display screen.

BACKGROUND

Audio/video displays typically utilize some type of forward projection system that utilizes a projector that is mounted a predetermined distance from a screen. This screen can either be reflective for viewing from the same side as the projector or the screen can be somewhat less than opaque such that the projector can be mounted on the rear side of the screen and project the image through the screen. Typically, these projectors are mounted on some type of mobile caddy that is disposed in the room. However, such mounting of the projector utilizes valuable floor space within the viewing area. As such, some of the projectors are ceiling mounted away from the seating area or above the seating area.

The problem with this type of mounting system is the wiring, the fact that the mounting has to be predefined, and the lack of mobility of the configuration. In some applications, there has been provided a combination of structures for mounting the projector wherein the screen is part of the structure. However, these types of structures require some type of support for the projector in front of or at the rear of the screen in addition to the mounting structure for the screen.

Additionally, there is a need to provide transportability for the screen projection system in a carrying case. In uses such as the military, Homeland Security, corporate functions, trade shows, construction sites, etc., a projection system may be needed temporarily in different areas at a particular location and must then be broken down and moved to another location for use in another venue. Thus, there is a need for a display system that may be easily broken down into a portable configuration while still providing the support for the projector enabling display of images upon an associated screen.

SUMMARY

The present invention as disclosed and described herein, in one aspect thereof, comprises a portable projection screen system. The system includes a foldable structure defining a viewing area. A projector mounting assembly includes first and second mounting arms spaced a selected distance apart. Each of the first and second mounting arms including a horizontal projector member located above the viewing area and extending forward of the viewing area. A vertical projector member connects to a backside of the viewing area in a plurality of positions. Each of the plurality of positions locates the horizontal projector member at a different height above the viewing area. A projector crossbar member slidably connects and moves between a plurality of positions that are each a different distance from the viewing area.

BRIEF DESCRIPTION OF THE DRAWINGS

For a more complete understanding, reference is now made to the following description taken in conjunction with the accompanying Drawings in which.

DETAILED DESCRIPTION

Figure 1:
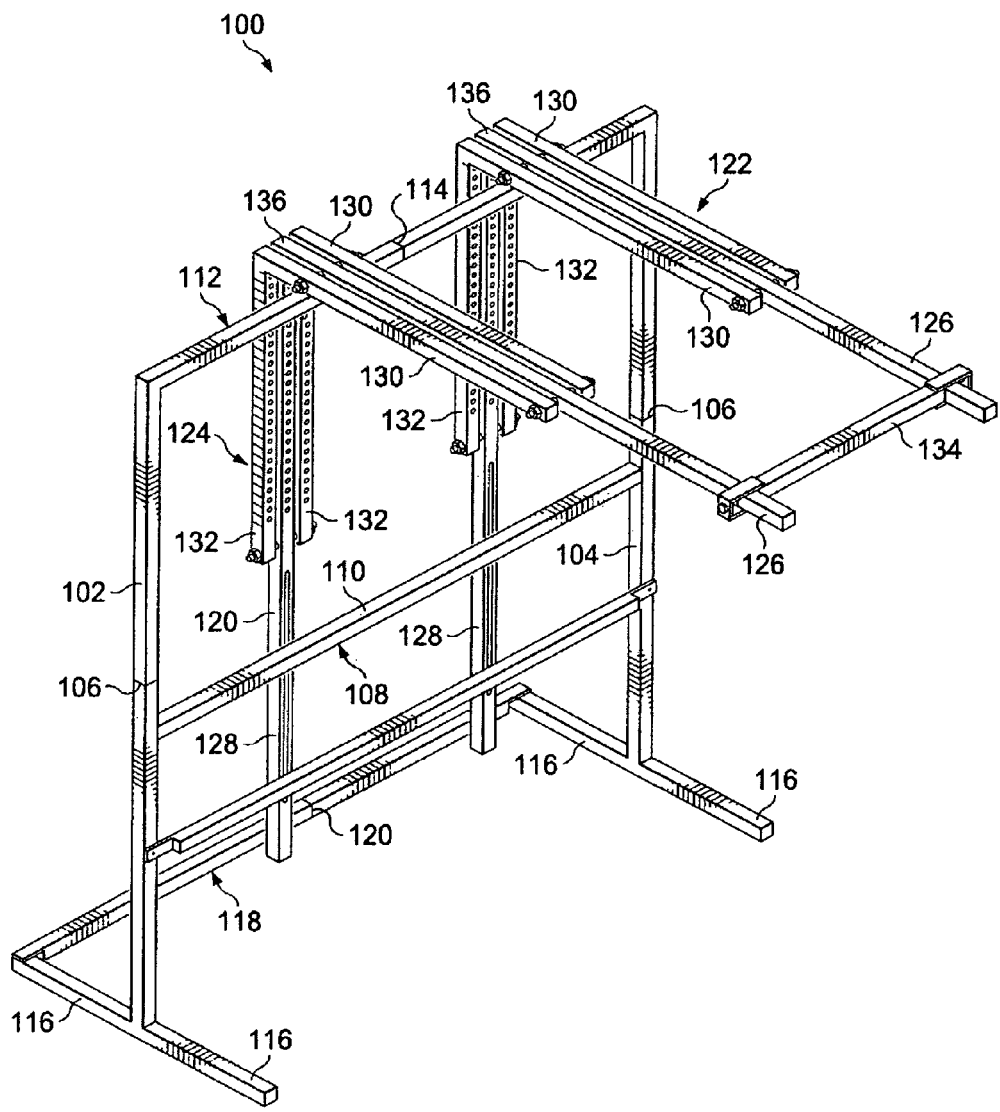
FIG. 1 illustrates the projector and screen mounting system of the present disclosure.

Referring now to the drawings, wherein like reference numbers are used herein to designate like elements throughout, the various views and embodiments of portable projector and screen mounting system are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a perspective view of the projector and screen mounting system of the present disclosure. A screen frame 100 includes a first multi-piece, vertical member 102 and a second multi-piece, vertical member 104. The first and second multi-piece, vertical members 102 and 104 are collapsible into a portable configuration along at least one hinge point 106. While the present description describes only a single hinged point 106, it should be realized that any number of hinge points 106 may be utilized in order to collapse the screen into a more portable configuration. A lower screen crossbar member 108 connects between the first vertical member 102 and the second vertical member 104. The lower screen crossbar member 108 is collapsible at a hinged point 110, enabling the lower screen crossbar member 108 to collapse into at least two portions. As with the vertical members 102 and 104, the lower screen crossbar member 108 may also be hinged at multiple points. A top screen crossbar member 112 interconnects the top of the first vertical member 102 and the top of the second vertical member 104. The top screen crossbar member 112 is also hinged to collapse at point 114 in a similar manner to the lower screen crossbar member 108. In alternative embodiments, the top screen crossbar member 112 may also be hinged at multiple points. Each of the lower screen crossbar member 108 and upper screen crossbar member 112 are pivotally connected to the first and second vertical members 102 and 104 to allow collapse of the screen frame 100.

The first vertical member 102, second vertical member 104, lower screen crossbar member 108, and top screen crossbar member 112 define a rectangular area there between on which a viewing screen may be connected. The screen surface can be approximately 60 to 100 inches wide and approximately 40 to 60 inches tall. In a preferred embodiment, the screen is connected via snap connectors to the screen frame defined by the first and second vertical members 102 and 104 and the bottom and top crossbar members 108 and 112. However, other types of connecting apparatus may also be utilized.

The first and second vertical members 102, 104 are maintained in an upright position using a base foot member 116. The base foot members 116 fold parallel to each of the first vertical member 102 and second vertical member 104 in a portable configuration. The base foot members 116 may be interconnected via a removable crossbar base member 118. The crossbar base member 118 connects between the base foot extenders 116 to provide additional stability to the screen frame 100. The crossbar base member 118 is also collapsible to half its size at a hinge connection point 120 or in alternative embodiments, may have multiple hinged points. The crossbar base member 118 can be attached to the ground or weights may be placed on the crossbar base member 118 to make the screen structure more stable.

A projector mounting assembly includes a first projector support arm 122 and a second projector support arm 124. The first and second projector support arms 122, 124 each include a horizontal support arm member 126 and a vertical support arm member 128. The vertical support arm member 128 and horizontal support arm member 126 are pivotally connected with each other at one end thereof. Mounted to each lateral side of the horizontal support arm member 126 are lateral support members 130 that are bolted to each side of the horizontal support arm member 126. Lateral support arms 132 are also mounted to each side of the vertical support arm member 128. The lateral support arms 130 and 132 provide a stronger structural support for the projector support arm 122 and 124 to support the weight of a projector mounted on a projector crossbar member 134. The projector support arms 122 and 124 are hinged at point 136 to enable the projector support arms 122 and 124 to be folded into a portable configuration. Each of horizontal support arms 126 and vertical support arms 128 would also include at least one additional hinge point to enable the associated support arms to be folded into a portable configuration.

The projector crossbar member 134 is used for mounting a projector (not shown) that provides the image source for the assembly. The projector can be an LCD or DLP projector or may utilize any other type of image source generation technology that can project an image from the front thereof at a distance to a screen mounted on the screen frame 100 as described hereinabove. Any type of projector can be utilized provided that it has reasonably lightweight characteristics and in one embodiment may be a distance of approximately one screen width or less from the image screen.

The projector support arms 122 and 124 are fully adjustable to the left or right along the upper screen crossbar member 112 and lower screen crossbar member 108, as will be more fully described here and below. The projector support arms 122 and 124 may be additionally moved vertically up or down on the upper screen crossbar member 112 and lower screen crossbar member 108. The top screen crossbar member 112 and lower screen crossbar member 108 include a series of rivnuts along the length thereof. These rivnuts enable a bolt to be placed through the vertical support arms 128 of the projector support arms 122 and 124 to enable positioning of the projector support arms 122 and 124 at a desired location.

The components comprising the screen frame 100 and projector support arm assembly, in a preferred embodiment, comprise extruded aluminum or black anodized aluminum stock that is rectangular. This enables the provision of a fairly lightweight structure that may be collapsed along the various hinged break points described here and above to enable placement of the structure in an associated carrying case.

Figure 2:
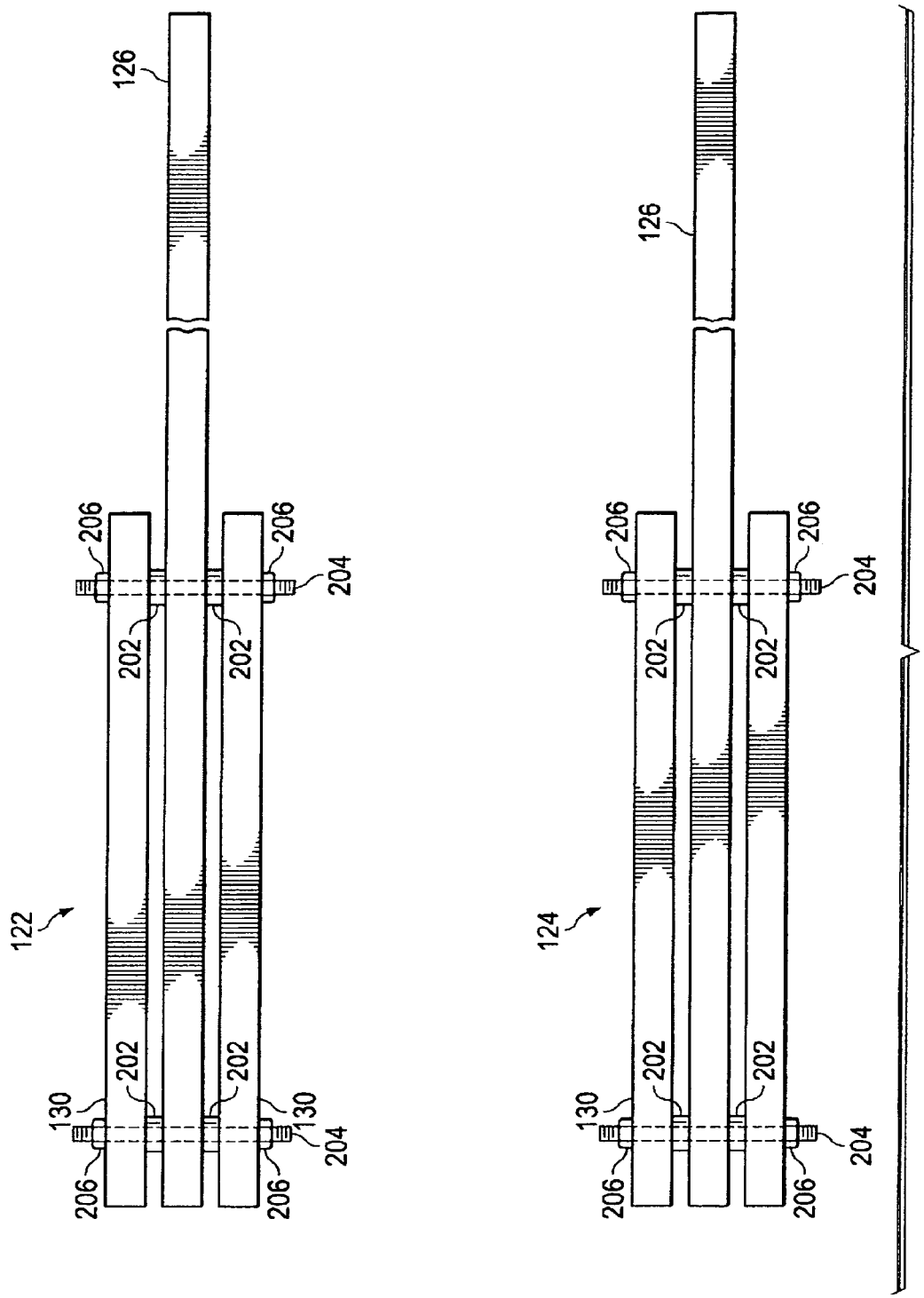
FIG. 2 is a top view of the projector mounting arms.
Figure 3:
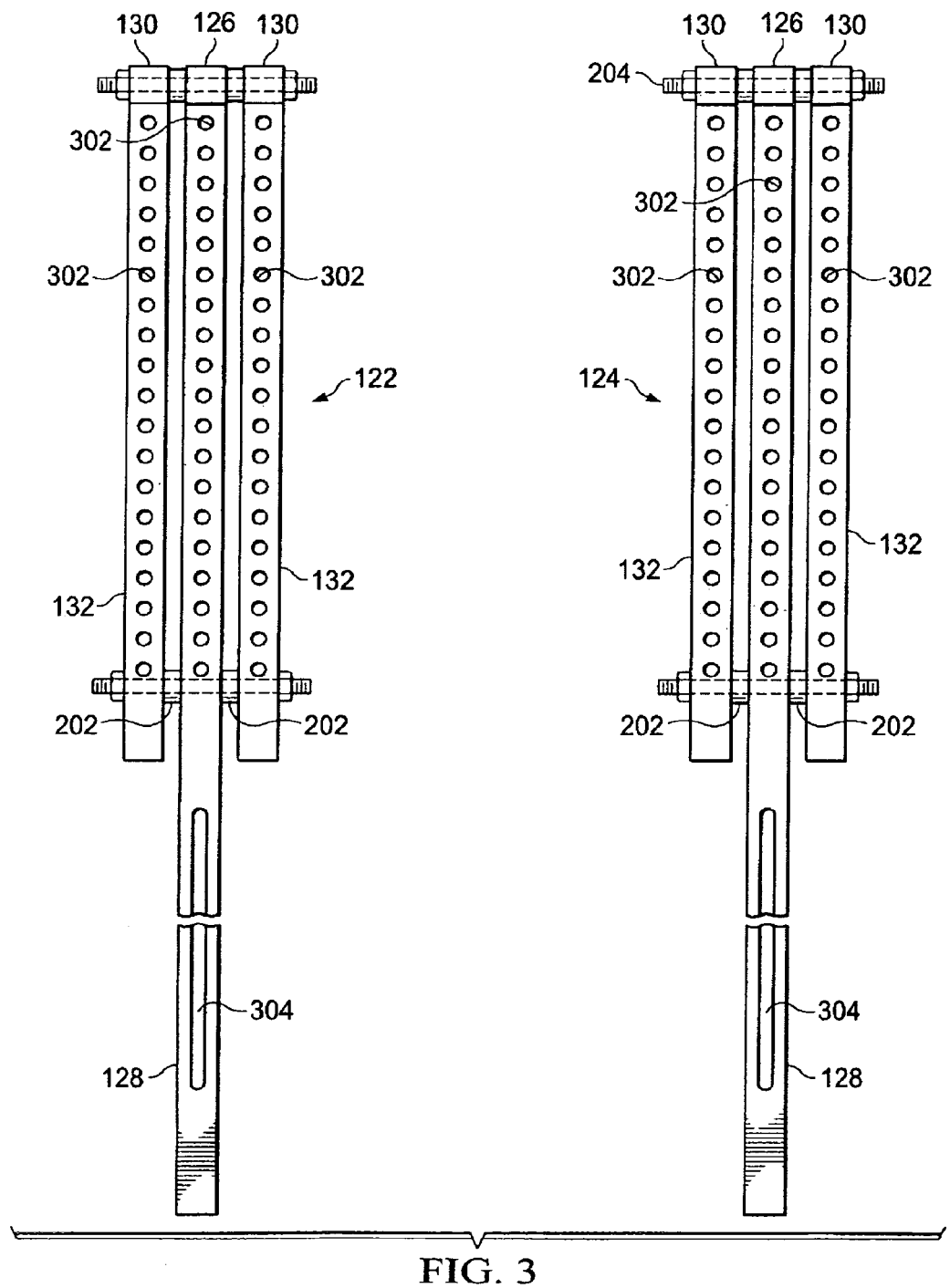
FIG. 3 is a back view of the projector mounting arms.

Referring now to FIGS. 2 and 3, there are provided a top view of the projector support arms 122 and 124 (FIG. 2) and a rear view of the projector support arms 122 and 124 (FIG. 3). As can be seen, horizontal support arm member 126 is connected between lateral support members 130 placed on each lateral side of the horizontal support arm member 126. The lateral support members 130 are spaced from the sides of the horizontal support arm member 126 by a series of spacers 202. The spacers 202 comprise a cylinder defining a hole therethrough. The spacers 202 are placed between the lateral support members 130 and the horizontal support arm member 126, and a threaded rod 204 is placed through each of the lateral support members 130, spacers 102, and horizontal support arm member 126 to connect the structure together. A nut 206 is placed on each side of the threaded rod 204 to secure the lateral support members 130, spacers 102 and horizontal support arm member 126 between a pair of nuts 204 on the threaded rod 204.

The vertical support arm member 128 is also provided additional support by a pair of lateral support arm member 132. An additional group of spacers 202 are placed between the lateral support arm member 132 and the vertical projector support arm member 128. As with respect to the top assembly, a threaded rod 204 is placed through the vertical support arm members 128, lateral support members 132, and spacer 202 and secured on each side by a nut 206.

Each of the vertical projector support arm members 128 include a series of holes 302 along the upper portion of the vertical projector support arm member 128. These holes are used for bolting the projector support arms 122 and 124 to the top screen crossbar member 112. Each hole is associated with a different level that the horizontal projector support arm 126 is raised above the top screen crossbar member 112. A lower securing slot 304 is used for securing the lower portion of the projector support arms 122 and 124 to a lower screen crossbar member 108.

Figure 5:
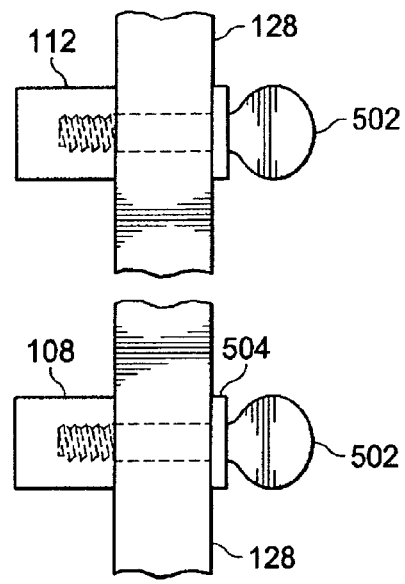
FIG. 5 illustrates the manner for connecting the projector mounting arms to the screen crossbar members of the screen mounting assembly.

The manner for securing the projector support arms 122 and 124 to the screen assembly 100 is more particularly illustrated in FIG. 5, wherein the vertical support arm member 128 is bolted to the top screen crossbar member 112 using a thumb screw 502 including an integrated shoulder washer. The thumb screw 502 is placed through the hole 302 of the vertical projector support member 128 and threaded into a threaded hole on the back side of the top screen crossbar member 112. Each of the holes within the top screen crossbar member 112 preferably includes a rivnut threadedly engaging the thumb screw 502. With respect to the lower connection, the thumb screw 502 is placed within the slot 304 and threadedly engages a corresponding hole within the lower screen crossbar member 108. The hole within the lower screen crossbar member 108 will include a threaded rivnut similar to that discussed with respect to the upper hole 302 of the vertical projector support arm 128, but since a slot 304 is being used on the lower support arm portion, the integrated shoulder washer of the thumb screw 502 secures the vertical projector support arm member with the lower screen crossbar member 108.

Figure 4:
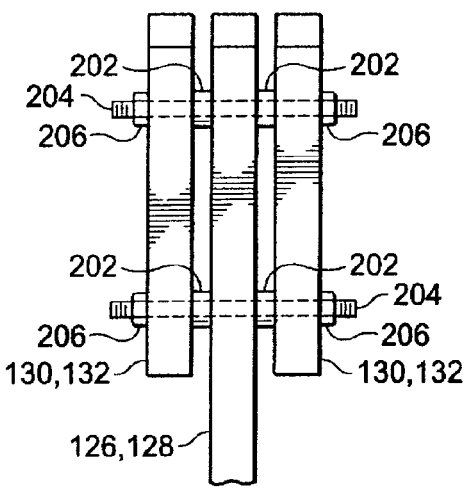
FIG. 4 more particularly illustrates the structure for interconnecting the various members of the projector mounting arms.

Referring now to FIG. 4, there is more particularly illustrated the interconnections of the horizontal or vertical projector members 126, 128 with the lateral support members 130, 132. As described, these central members are separated from the lateral support members 130, 132 by a group of spacers 202 comprising a cylinder with an opening therethrough. The threaded rod 204 is placed through the lateral support members 130, 132 on each side and through the spacers 202 and the central projector support arm member 128, 126. The assembly is secured together with nuts 206 on each end of the threaded rod 204.

Figure 6:
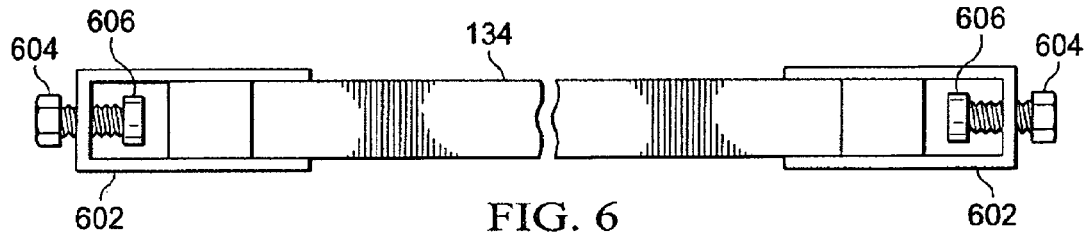
FIG. 6 is a side view of the projector support arm.

Referring now to FIG. 6, there is more particularly illustrated the projector crossbar member 134. The crossbar member 134 is made from rectangular aluminum as described previously with respect to the remainder of the structure. Placed on each end of the crossbar member 134 are a pair of U-shaped brackets 602. The U-shaped brackets 602 define an opening through which the horizontal projector support arm members 126 may be inserted to support the projector cross member 134. In order to secure the projector crossbar member 134 in a fixed position, a rotatable bolt 604 is threaded through a threaded hole on the end of the brackets 602. By rotating the threaded bolt 604, a nylon stopper 606 connected to the end of the threaded bolt 604 engages the surface of the horizontal projector support arm member 126 in order to secure the projector crossbar member 134 in a fixed position. By loosening the threaded bolt 604, the projector crossbar member 134 may be moved toward or away from the screen surface along the length of the horizontal projector support arm member 126 in order to position a connected projector closer to or further away from the surface of the screen mounted on the screen frame.

Figure 7:
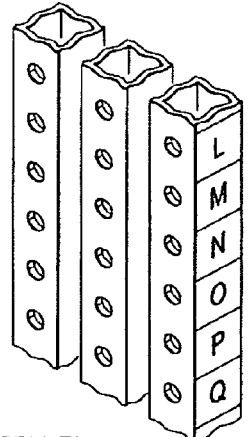
FIG. 7 illustrates the identifier scheme associated with each of the projector mounting arms.

The ability to move the projector cross member 134 enables the projector throw distance to be adjusted as desired. The horizontal projector support arms members 126 and 128 are placed approximately 30 inches apart and centered about the center of the screen. The vertical projector support arm members 128 will include approximately 26 holes in the arms next to the back of the screen surface as illustrated in FIG. 7. These holes are labeled A through Z. A thumbscrew through one of these holes attaches to the top screen cross member 112. A thumbscrew through the slot 304 threadedly engages the bottom screen cross member 108. The holes are used to adjust the parallel arms up and down to provide the appropriate projector offset. Projector offset is the distance from the top of the projected image to the center of the projector lens.

Figure 8:
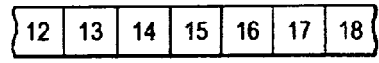
FIG. 8 illustrates the identification scheme for use with the projector support member.

As discussed with respect to FIG. 6, the projector crossbar member 134 is parallel to the screen and slides toward or away from the screen to set the projector throw distance. A series of numbers as illustrated in FIG. 8 included on the inside arms of each of the horizontal projector support arm members 126 enables the throw distance of the projector to be established. For each different type of projector model, a letter for the projector offset and a number for the projector throw distance will be the same every time the screen is set up for the associated projector. This will reduce setup time and provide a quick and easy fashion for establishing the projector offset and throw distance during setup. The projector crossbar member 134 will additionally include a white circle attached to the middle of the bar on all four sides to denote the center of the screen, enabling the projector to be easily moved left or right to center the image on the screen.

Figure 9:
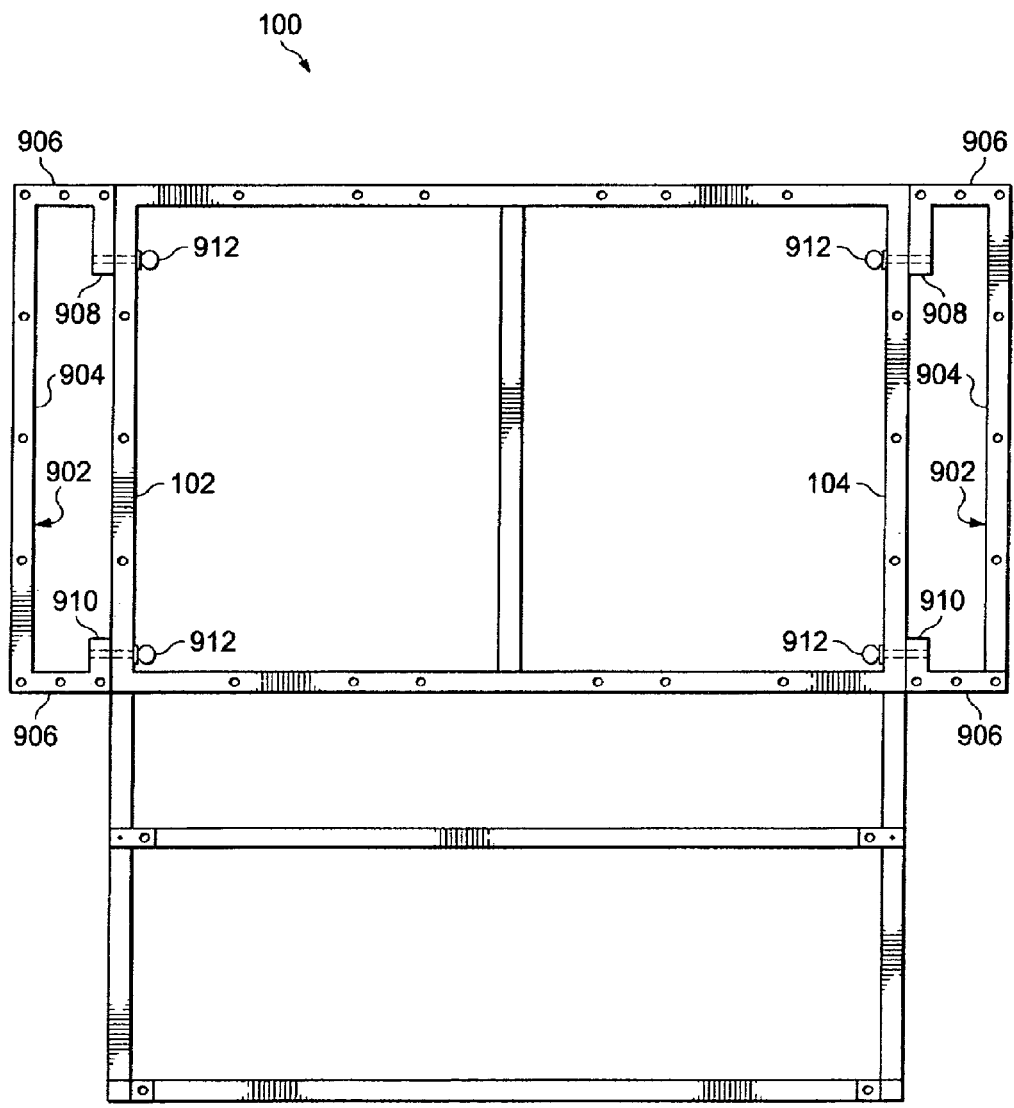
FIG. 9 illustrates the screen wings that may be connected to the projector mounting assembly.

Referring now to FIG. 9, there is illustrated a front view of the screen frame 100 that includes a pair of screen wings 902 that are connected to the vertical support members 102 and 104, respectively. The screen wings 902 comprise a C-shaped structure including a single vertical hinged side member 904 that defines an extended edge of the screen area. The width of the screen is extended by a pair of extender members 906 that are connected perpendicularly to the vertical side member 904. The extender members 906 extend the width of the screen out past the current vertical members 102 and 104. The screen wings 902 are attached to the vertical members 102 and 104 via a top connection member 908 and a bottom connection member 910. A thumbscrew is placed through an opening in the vertical member 102/104 and engages threaded opening 912 within the upper connection member 908 and lower connection member 906. The threaded opening may comprise a rivnut that threadedly receives the thumbscrew.

The screen wings are attached to the right and left sides of the screen frame to provide a new wider screen surface. This changes the form factor of the screen's surface. By adding the wings to each side of the screen frame, the screen surface becomes wider providing a new form factor. By adding wider wings to each side of the screen frame, the screen surface becomes a wider providing any required form factor. Thus, the addition of wings of various sizes enables the changing of the screen and form factor, providing a portable display with flexible capabilities.

Figure 10A:
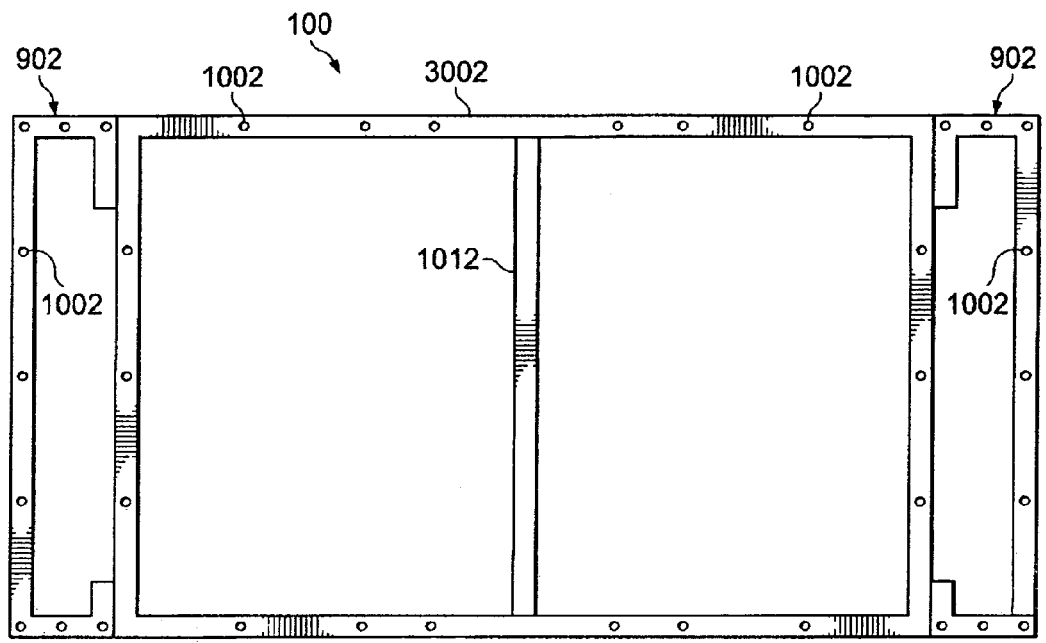
FIG. 10A illustrates the various screen snaps associated with the projector mounting assembly.
Figure 10B:
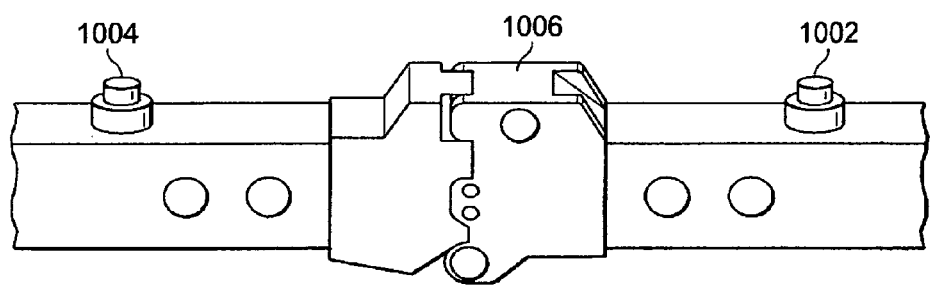
FIG. 10B illustrates the screen connector snaps with associated offsets.
Figure 11:
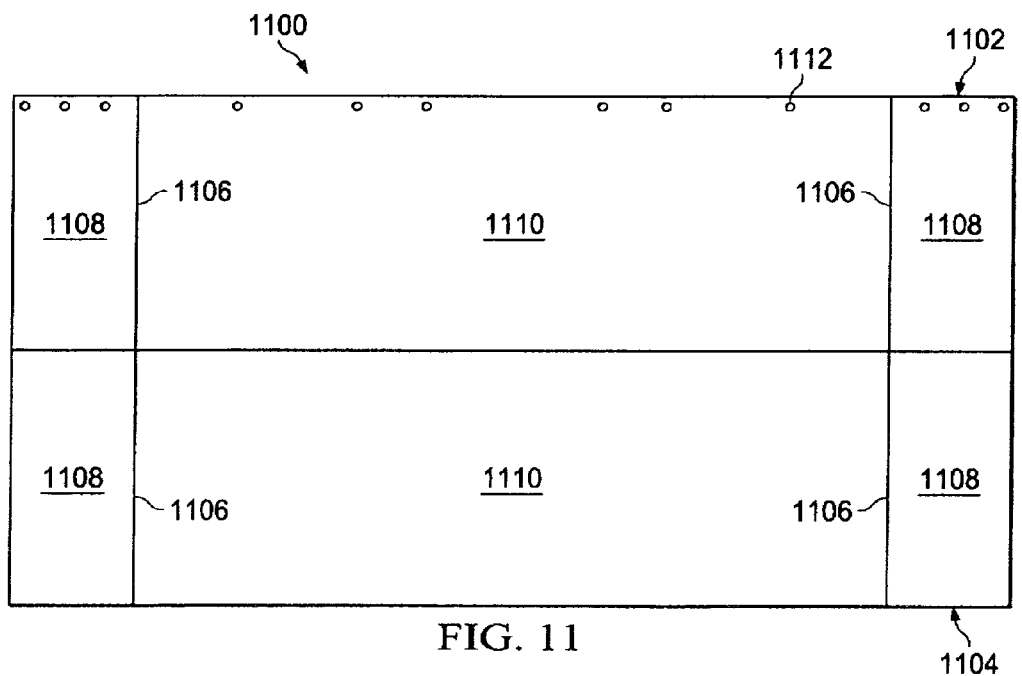
FIG. 11 illustrates the support board that may be placed over the screen support assembly.

Referring now to FIG. 10A, there is illustrated a front face of the projector screen frame 100. The projector screen frame 100 includes a pair of screen wings 902 attached to the vertical members of the screen frame 100. The screen frame 100 includes a plurality of snap connections 1002 that are placed around the edges of the frame. Referring now also to FIG. 10B, these snap connections 1002 attach the screen to the screen frame. The snap connections 1002 include an offset 1004 below them in order to raise the surface of the screen from the surface of the frame. This provides two benefits. First, the hinge 1006 upon the screen frame no longer touches the surface of the screen causing deformations in the screen's surface. Additionally, the use of the offsets 1004 enable a foam backing 1100 to be placed between the screen frame and the screen surface as illustrated in FIG. 11.

By including the foam backing 1100, an interactive screen functionality is provided to the display screen. The foam backing 1100 enables an annotation pen to touch the vinyl screen surface without penetrating the screen plane. The projector may display the annotation on the screen as the pen is drawn across the screen's surface. The foam backing 1100 includes, in one embodiment, a top section 1102 and a lower section 1104. The top section 1102 and lower section 1104 include a pair of foldable connections 1106 enabling side wings 1108 to be folded over onto a center portion 1110. The surface of the foam backing 1100 includes a series of holes 1112 that are placed to receive a snap connector 1002 and spacer 1004. Thus, the screen can be snapped onto the associated snap connector 1002 through the hole 1112 in the foam backing 1100. Referring now back to FIG. 10A, in a further embodiment, a center support bar or bars 1112 may be placed within the open center area of the screen frame 100 to provide support for the foam backing 1100 placed thereover. Once the foam backing 1100 is placed behind a screen and secured between the screen and the screen frame 100, an interactive pen may be used to engage the screen and perform interactive functionalities upon the display screen as described previously.

Figure 12:
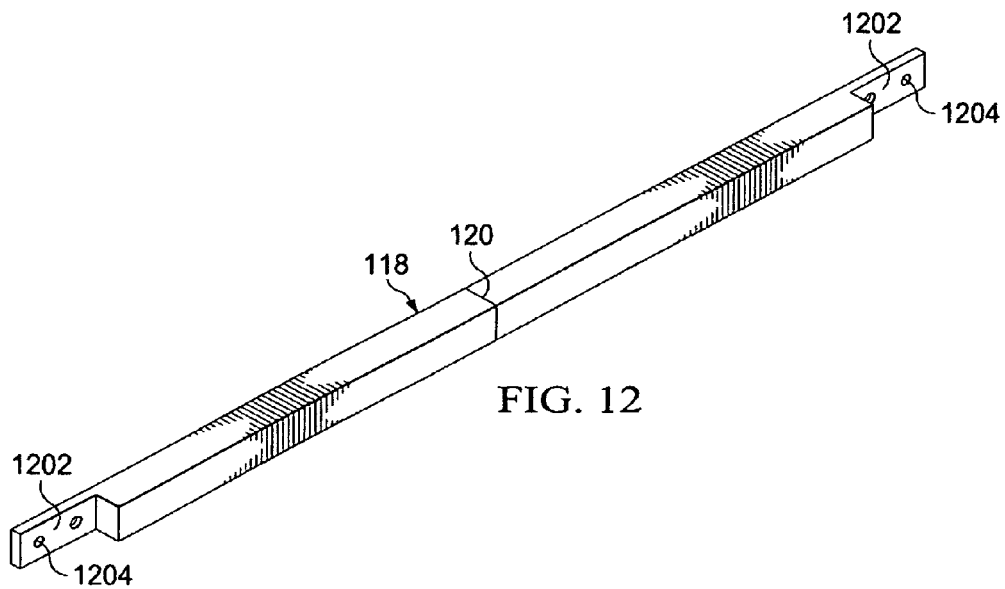
FIG. 12 illustrates the crossbar member for use with the projector support assembly.

Referring now to FIG. 12, there is more particularly illustrated the crossbar member 118 that may be placed either between the vertical members 102 and 104 to provide additional structural support or between the foot members 116 to provide more stability for the base of the screen frame 100. The crossbar member 118 comprises a rectangular tubular member such as the remainder of the screen frame structure, and includes at least one hinged point 120 in the center thereof enabling the crossbar member 118 to be folded at least in half. On each end of the crossbar member 118 are a pair of metal tab brackets 1202 enabling the crossbar member 118 to be bolted to either the vertical crossbar members 102 and 104 or to the base support foot members 116. The metal tabs 1202 define one or more holes 1204 therein through which a bolt may be threaded to engage a rivnut or threaded hole upon the vertical arms 102, 104 or foot members 116.

Figure 13:
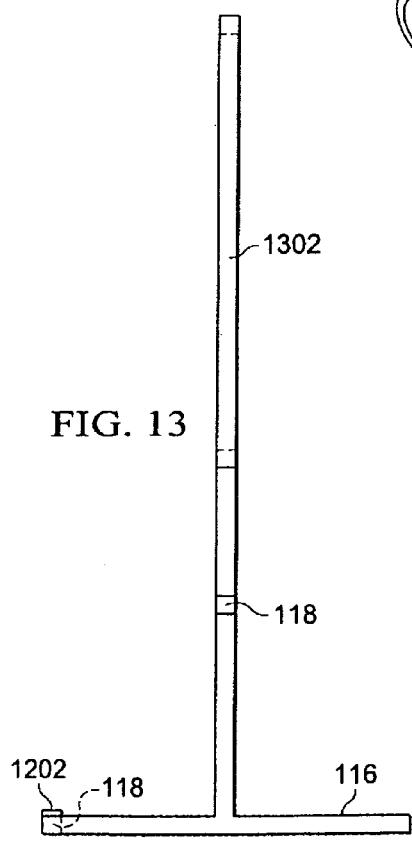
FIG. 13 illustrates one manner for connecting the crossbar member on the projector screen support assembly.

The location of the tab bracket 1202 enables the crossbar member 118 to be placed in the same plane as the screen 1302 as illustrated in FIG. 13. Additionally, the crossbar member can be connected between the pair of foot members 116. The tab brackets 1202 on the outside edge of the foot member 116 and the base support member 118 lies between the foot members to provide a more stable base support for the screen frame 100.

Figure 14:
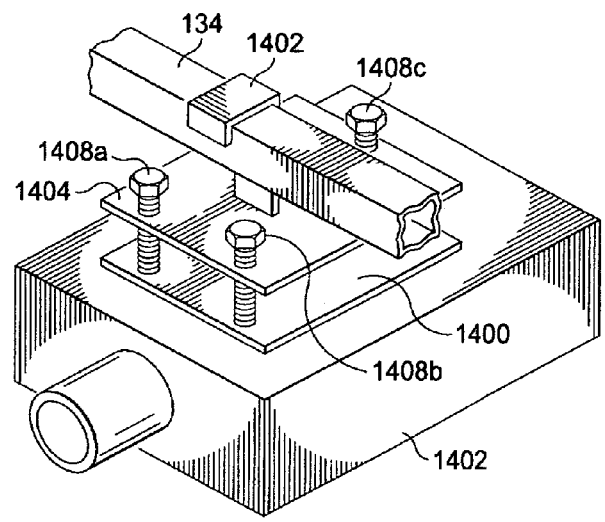
FIG. 14 illustrates the projector mounting bracket.

Referring now to FIG. 14, there is illustrated a bracket for interconnecting the projector 1402 on the projector crossbar member 134. A hooked bracket 1402 defines a square C-shaped opening for engaging the surface of the projector crossbar member 134 is connected to an upper plate 1404. The upper plate 1404 is of a generally square shape but need only have a sufficient configuration to include a number of adjustment bolts as will be described herein below. A second lower mounting plate 1406 is connected to the upper surface of the projector 1402. Each of the upper plate 1404 and lower plate 1406 are interconnected by a series of adjustment bolts 1408 that pass through the upper plate 1404 and engage a threaded hole within the lower plate 1406. The adjustment bolts 1408 are in a triangular configuration with the base of the triangle being defined by two bolts that are on the same side as the projecting lens of the projector 1402 and the third adjustment bolt 1408C being located on the opposite side of the cross projection crossbar 134 toward the back edge of the projector 1402. By using the adjustment bolts 1408A and 1408B, the level of the projector 1402 may be adjusted along the horizontal axis of projection of the projector 1402. Using the adjustment bolt 1408C, the level of the projection from the projector 1402 along the vertical axis may be adjusted.

Figure 15:
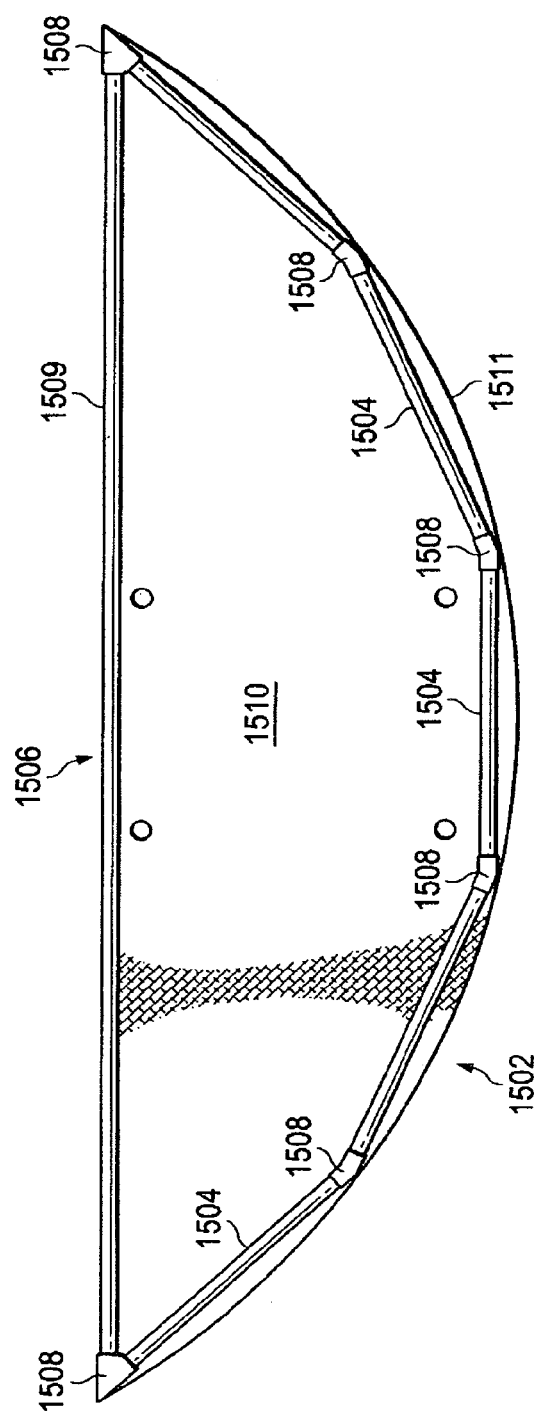
FIG. 15 illustrates the screen canopy.

Referring now to FIG. 15, there is illustrated the canopy structure 1502 for use with the screen frame 100 and projector support arm 122 and 124. The canopy structure 1502 reduces ambient light on the screen surface, which improves contrast and brightness upon displayed images on the screen. The width of the canopy structure 1502 is governed by the width of the typical display booth for exhibits and trade shows. The width of the typical trade booth is ten feet. Thus, in one embodiment the canopy width is 116 inches wide, 4 inches less than 10 feet. The canopies will extend out 64 inches over the projector support arms 122 and 124.

As can be seen in FIG. 15, the frame of the canopy structure consists of a number of support poles 1504. The base member can include a single support pole 1504 or a number of interconnected support poles 1504 comprising the entire back edge 1506. The support poles 1504 in one embodiment may consist of similar material as lightweight tent poles. The poles slide into each other at connectors 1508 at each corner or in their centers to provide longer poles and may be connected together via a stretchable shock cord that runs through the interior of all of the support members 1508, ensuring the poles remain together even when disassembled. A first support pole 1504 is slid into a sleeve defined along a back edge 1509 of a lightweight fabric 1510. A second support pole 1504 is placed in a sleeve defined along a front edge 1511 of the light weight fabric 1511. The lightweight fabric 1510 would include a number of grommets or openings defined therein, enabling the lightweight fabric 1510 to be connected to the support poles 1504 using, for example, Velcro straps, fabric loop or some other type of connection means.

Figure 16:
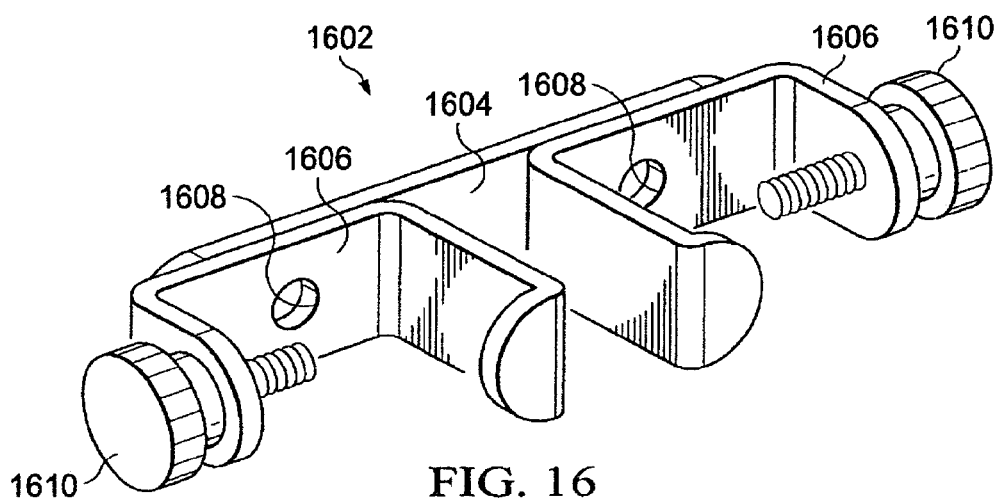
FIG. 16 illustrates a first perspective view of the screen connection bracket.
Figure 17:
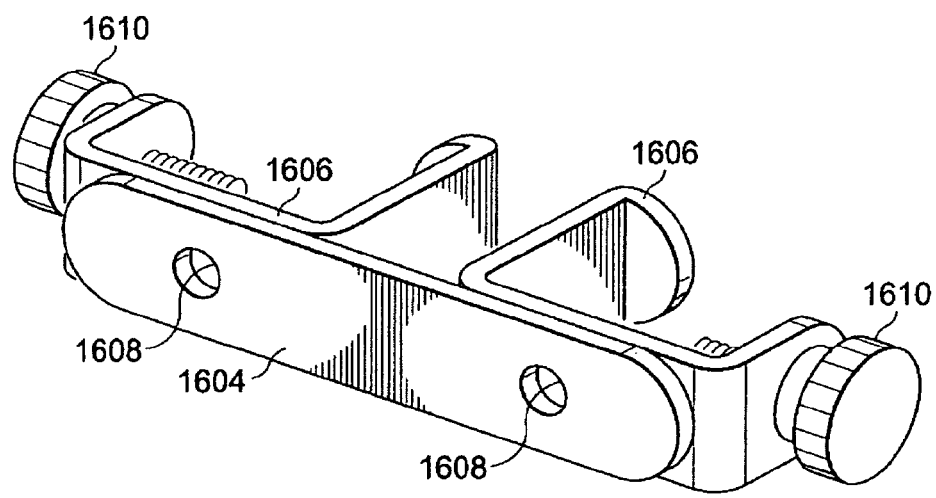
FIG. 17 illustrates a second perspective view of the rear side of the screen connection bracket.

Referring now to FIGS. 16 and 17, there are provided a pair of perspective views of the screen frame joining clamps 1602. The screen frame joining clamps 1602 are used for joining together the vertical support members 102, 104 of adjacent screen frames 100 in order to connect multiple frames together to provide a larger viewing surface. The joining clamps 1602 consist of a base portion 1604 comprising a substantially flat plate to which a pair of screen connector clamps 1606 are welded or bonded in some fashion. The screen connector clamp 1606 comprises a substantially C-shaped rectangular bracket into which the rectangular tubing of the vertical members 102, 104 of the screen frame 100 may be inserted. A registration hole 1608 is defined in the bottom of each connection clamp 1606 to enable the clamps to be aligned at a particular location on the vertical members 102, 104. A threaded bolt or thumbscrew with integrated shoulder washer 1610 is threaded through each clamp 1606 in order to provide a means for securing the clamp to a vertical member 102, 104 of the screen frame 100. By turning the knob of the threaded bolt or thumbscrew 1610 in a first direction, the bracket 1606 is secured to the vertical member 102, 104. By turning the knob of the threaded bolt or thumbscrew 1610 in a second direction, the bracket 1606 may be released and removed from the vertical member 102, 104 of the screen frame 100. The bolt or thumbscrew 1610 would engage a rivnut in vertical support members 102,104.

Figure 18:
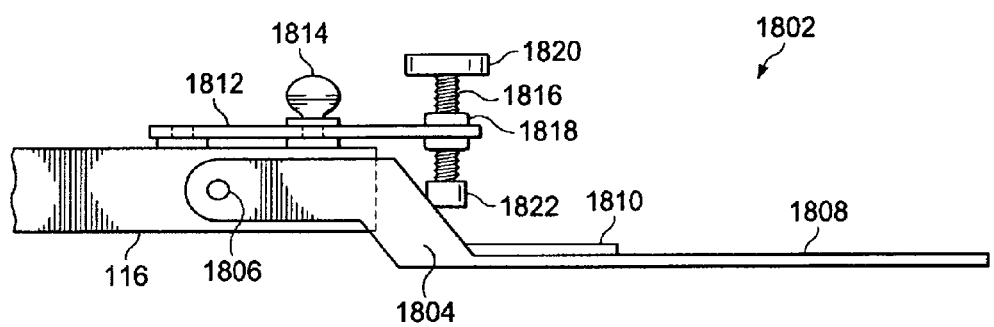
FIG. 18 illustrates a side view of the leg extension support member.
Figure 19:
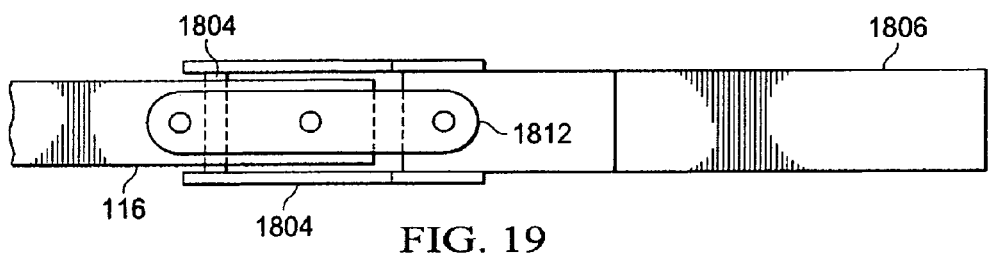
FIG. 19 illustrates a top view of the leg extension support member.

Referring now to FIGS. 18 and 19, there are illustrated a side view and top views, respectively, of the foot extender mechanism for use with the base members 116 of the screen frame assembly 100. The foot extender mechanism can be connected to the front or back base members 116. The adjustable foot extender 1802 includes a pair of side plates 1804 that are pivotally connected to each of the sides of the base member 116. The side plates 1804 pivot about a shaft 1806 that runs through the base member 116. A pivot point or joint may alternatively be used. At the opposite end from the shaft 1806, a foot plate 1808 is perpendicularly connected to each of the side plates 1804. The foot plate 1808 comprises a substantially rectangular plate having sloped, angled, or chamfered edges thereon to provide a smooth transition from floor to the top surface of the foot plate 1808. An additional support plate 1810 is connected to the end of the foot plate 1808 closest to the base member 116. The additional support plate 1810 provide improved structural integrity between the slide plates 1804 and the foot plate 1808 and additionally provides for the ability to further adjust the foot plate 1808 in a downward direction as will be more fully described in a moment.

An adjustment support arm 1812 is connected to the top surface of the base member 116. The adjustment support arm 1812 is connected to the base member 116 by a pair of rivnuts 1814, or alternatively, some type of bolt or other type of bonding connection may be utilized. The adjustment support arm 1812 extends out past the end of the base member 116 to rest over the support plate 1810 and base plate 1808. A threaded bolt 1816 is threaded through an additional rivnut 1818 within the adjustable support arm 1812. A knob 1820 is used for rotating the threaded bolt 1816 in a clockwise and counter clockwise directions in order to adjust the position of a nylon stop 1822 that engages the surface of the support plate 1810. By extending the nylon stop 1822 as far downward as possible, the adjustment plate 1810 is pushed down, causing the base plate 1808 to angle downward from the base of the base member 116 below the central axis of the base member 116. This causes the face of the screen frame 100 to tilt slightly upwards. Similarly, when the bolt turns the stop 1822 to rise as high upward as possible, the face of the screen frame 100 may be allowed to tilt slightly forward. This is caused by the base plate 1808 angling above the central axis of the base member 116. By adjusting the positions of the nylon stop 1822 with respect to the support plate 1810, a variety of positions for the screen frame base members may be utilized between these two positions in order to find a desirable viewing position.

Figure 20:
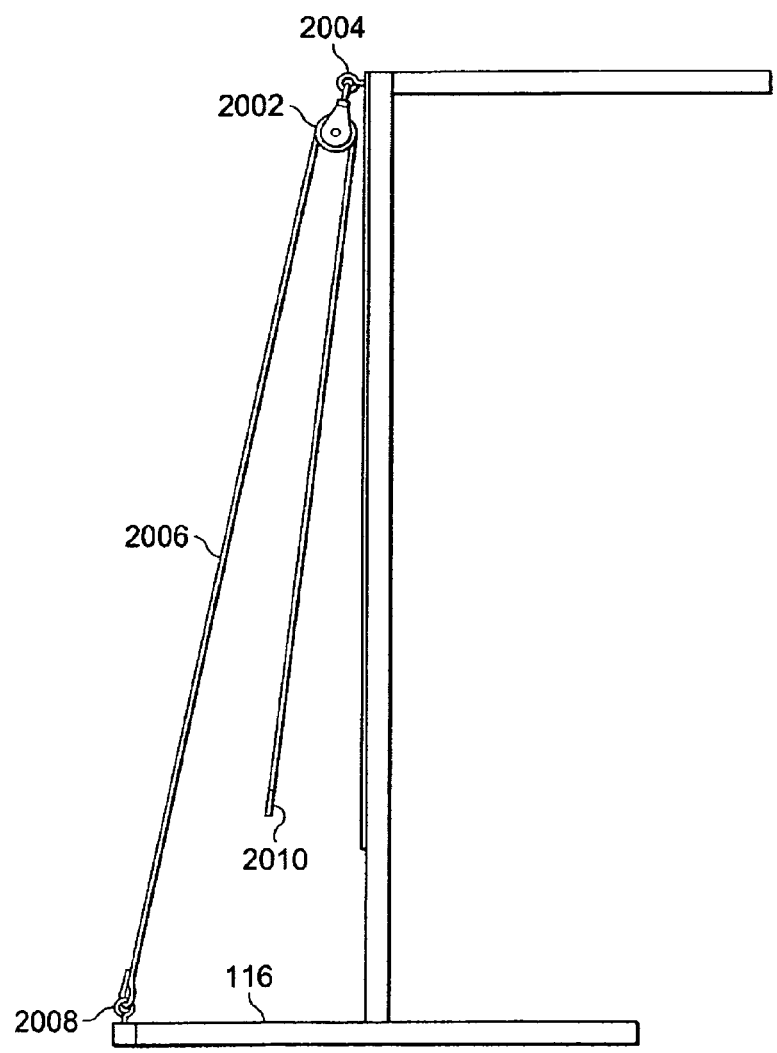
FIG. 20 illustrates the screen ratchet cable support.

Referring now to FIG. 20, there is more fully illustrated a ratchet pulley system that may be used for providing an additional support to counteract the weight of the projector placed upon the projector support arms 122 and 124. A ratchet pulley 2002 may be connected to an I-bolt 2004 connected to a back side of vertical members 102 and 104 of the screen frame 100. A cable 2006 has a first end fixedly connected to an I-bolt 2008 on a base member 116 of the screen frame 100 and passes through the ratchet pulley 2002. By pulling on the second end 2010 of the cable, the distance between the ratchet pulley 2002 and I-bolt 2008 can be decreased and maintained by the locking function of the ratchet pulley 2002 providing a force to counteract the weight of the projector being placed at the end of the projector support arms 122, 124. This tension within the cable counteracts the weight of the projector.

Figure 21:
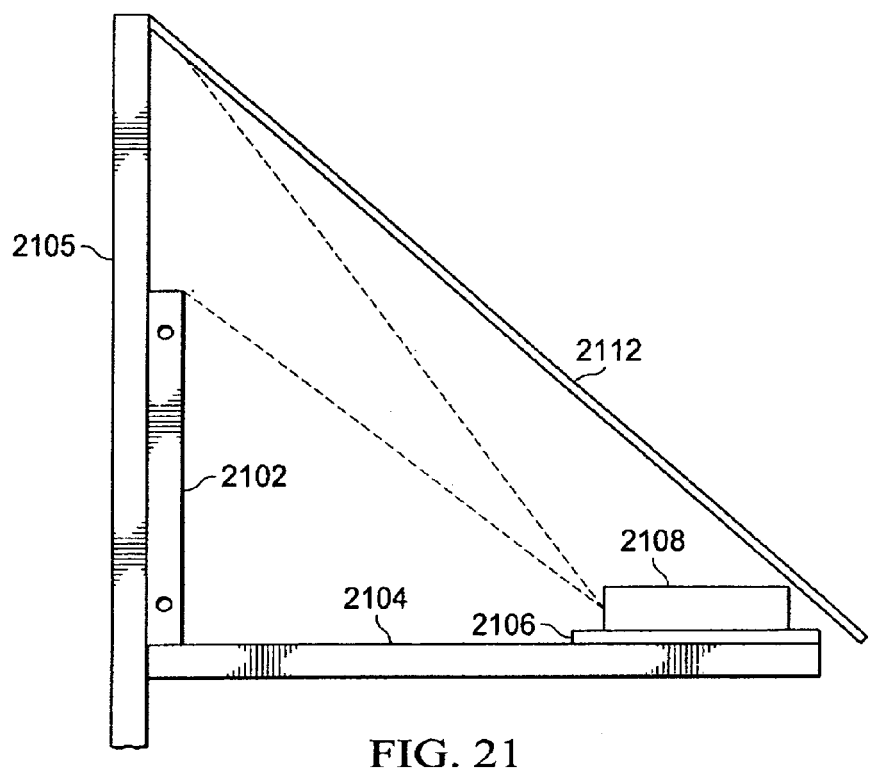
FIG. 21 illustrates the rear throw projector support shelf side view.
Figure 22:
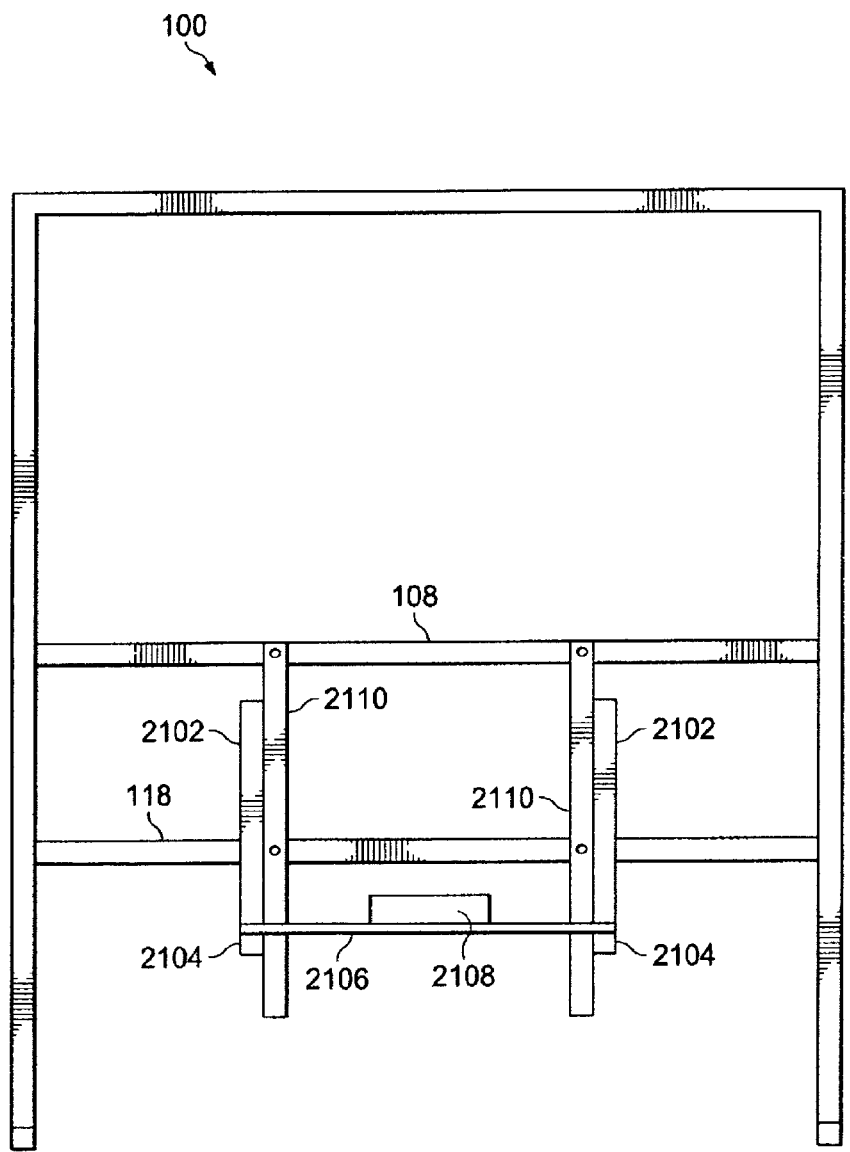
FIG. 22 illustrates a back view of the rear throw projector support shelf.

Referring now to FIGS. 21 and 22, there are provided a side view (FIG. 21) and a rear view (FIG. 22) of an alternative means for placing the projector 2108 rather than using projector support arms mounted to the top of the screen frame 100. In this embodiment, a rear connected projection shelf 2100 is connected to the bottom screen cross member 108 and a crossbar member 118. The rear shelf projector bracket 2100 consists of a vertical arm 2102 having a horizontal arm 2104 connected perpendicularly thereto. A support tray 2106 rests between a pair of horizontal arms 2104 extending from the rear of the screen on which the back throw projector 2108 may be placed. The vertical arms 2802 connect to the side of a pair of vertical projector screen supports 2110 that are mounted to the lower screen cross member 108 and the crossbar support member 118. In order to protect the projector 2108 from ambient light, a covering drape 2112 may be utilized that connects to the top of the screen frame 100 and drapes over the projector 2108 and shelf 2106.

It will be appreciated by those skilled in the art having the benefit of this disclosure that this portable projector and screen mounting system provides an improved manner for supporting a portable projection and screen. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A portable projection screen system, comprising:
   a first vertical member including at least one hinged point for folding the first vertical member into at least two separate portions;
   a second vertical member including at least one hinged point for folding the second vertical member into at least two separate portions, the second vertical member disposed parallel to the first vertical member and having substantially the same length as the first vertical member;
   a first horizontal member disposed perpendicular to and pivotally connected with the first and second vertical members including at least one hinged point for folding the upper horizontal member into at least two separate portions;
   a second horizontal member disposed perpendicularly and pivotally connected with the first and second vertical member including at least one hinged point for folding the second horizontal member into at least two separate portions and located below the first horizontal member to define a viewing area bounded by the first and second vertical members and the first and second horizontal members;
   a projector mounting assembly comprising:
      a first and second mounting arms spaced a selected distance apart, each of the first and second mounting arms including a horizontal projector member located above the first horizontal member and extending forward of the viewing area and a vertical projector member pivotally connected perpendicular to the horizontal projector member, wherein the vertical projector member connects to a backside of the viewing area in a plurality of positions, each of the plurality of positions locating the horizontal projector member at a different height above the first horizontal member; and
      a projector crossbar member slidably connected between the first and second mounting arms to which a projector is mounted, wherein the projector crossbar member slides between a plurality of positions, each of the plurality of positions a different distance from the viewing area.

2. The portable projection screen system of claim 1, wherein the first and second mounting arms further comprise:
- first and second lateral support members located on a first and a second lateral sides of the horizontal projector member and the vertical projector member;
- a plurality of spacers for separating the first and second lateral support members from the horizontal projector member and the vertical projector member; and
- a plurality of connectors for securing the first and second lateral support members with the horizontal projector member and the vertical projector member separated by the plurality of spacers.

3. The portable projection screen system of claim 1, wherein the vertical projector member further includes identifiers located on a surface thereof, each identifier associated with one of a plurality of predetermined positions of the horizontal projector member above the first horizontal member.

4. The portable projection screen system of claim 1, wherein horizontal projector member further includes second identifiers located on a surface thereof, each second identifier associated with a position of the projector crossbar member at a predetermined distance from the viewing area.

5. The portable projection screen system of claim 1 further including a screen canopy connected to the projector mounting assembly for shielding the viewing area form ambient light.

6. The portable projection screen system of claim 5, wherein the screen canopy further includes:
- a plurality of interconnecting members defining a support frame; and
- a fabric cover connectable to and supported by the support frame.

7. The portable projection screen system of claim 1, wherein the projector crossbar member further comprises:
- a first bracket connected to a first end of the projector crossbar member and defining an opening for slidably receiving a first one of the horizontal projector members to enable the projector crossbar member to move along the horizontal crossbar member;
- a second mounting bracket connected to a second end of the projector crossbar member and defining an opening for slidably receiving a second one of the horizontal projector members to enable the projector crossbar member to move along the horizontal crossbar member; and
- a plurality of securing mechanisms for locking the first end and the second end of the projector crossbar member into a fixed position on the horizontal projector members.

8. The portable projection screen system of claim 1 further including a pair of removable screen wings to increase the width of the viewing area, wherein the pair of removable screen wings connect to the first and second vertical members.

9. The portable projection screen system of claim 1 further including:
- a plurality of snaps located around the viewing area on the first and second vertical members and the first and second horizontal members;
- a plurality of spacers, each associated with one of the plurality of snaps for raising the level of the snap; and
- a viewing screen disposed over said viewing area and secured via the plurality of snaps.

10. The portable projection screen system of claim 9 further including a foam board that covers the entire viewing area and rests on the first and second vertical members and the first and second horizontal members, wherein the foam board defines a plurality openings through which the plurality of snaps may pass to engage the viewing screen.

11. The portable projection screen system of claim 1 further including:
- at least one base member pivotally connected to a base end of each of the first and second vertical members, the at least one base member pivoting between a first position parallel to the first or second vertical member and a second position perpendicular to the first or second vertical member;
- a ratchet pulley connected at top end of one of the vertical members;
- a tension line having a first end connected to one of the at least one base member that passes through the ratchet pulley and has a free second end; and
- wherein by pulling on the free second end a tension between the first end of the line and the ratchet pulley can be increased to counter act a weight placed on the projector crossbar member.

12. The portable projection screen system of claim 1 further including:
- at least one base member pivotally connected to a base end of each of the first and second vertical members, the at least one base member pivoting between a first position parallel to the first or second vertical member and a second position perpendicular to the first or second vertical member;
- an adjustable foot extender, the adjustable foot extender further comprising:
  - a pair of side plates for pivotally connecting to lateral sides of the at least one base member;
  - a stability plate connected between the pair of side plates and extending outward from the at least one base member to stabilize the portable projection screen system, wherein the stability plate may pivot from positions both above and below a central axis of the at least one base member;
  - a securing arm extending from a top surface of the at least one base member and including a threaded opening;
  - a securing bolt within the threaded opening that when rotated in a first direction a first end of the securing bolt engages the stability plate to pivot the stability plate below the central axis of the at least one base member and when rotated in a second direction enables the stability plate to pivot above the central axis of the at least one base member.

13. The portable projection screen system of claim 12, wherein the stability plate further comprises a rectangular plate, wherein long edges of the rectangular are chamfered to provide a transition to a top surface of the rectangular plate.

14. The portable projection screen system of claim 12 further including a plate placed between the stability plate and the first end of the securing bolt to provide further extension of the pivot angle of the stability plate below the central axis of the at least one base member.

15. The portable projection screen system of claim 1 further including a removable crossbar member that may connect between either the first and second vertical members or first and second base members pivotally connected to the first and second vertical members, the removable crossbar member including:
- a rectangular tubular bar having a length smaller than a distance between the first and second vertical members and including at least one hinged point for folding the tubular bar into at least two separate portions, the tubular bar having a first end and a second end;

a first plate connected to a first side on a first end of the rectangular tubular bar and defining at least one hole therein for bolting the first end of the rectangular tubular bar to either the first or second vertical member or the first or second base member; and a second plate connected to the first side on a second end of the rectangular tubular bar and defining at least one hole therein for bolting the second end of the rectangular tubular bar to either the first or second vertical member or the first or second base member.

16. A portable projection screen system, comprising:

a first vertical member including at least one hinged point for folding the first vertical member into at least two separate portions;

a second vertical member including at least one hinged point for folding the second vertical member into at least two separate portions, the second vertical member disposed parallel to the first vertical member and having substantially the same length as the first vertical member;

a first horizontal member disposed perpendicular to and pivotally connected with the first and second vertical members including at least one hinged point for folding the upper horizontal member into at least two separate portions;

a second horizontal member disposed perpendicularly and pivotally connected with the first and second vertical member including at least one hinged point for folding the second horizontal member into at least two separate portions and located below the first horizontal member to define a viewing area bounded by the first and second vertical members and the first and second horizontal members;

a projector mounting assembly comprising:

a first and second mounting arms spaced a selected distance apart, each of the first and second mounting arms including a horizontal projector member located above the first horizontal member and extending forward of the viewing area and a vertical projector member pivotally connected perpendicular to the horizontal projector member, wherein the vertical projector member connects to a backside of the viewing area in a plurality of positions, each of the plurality of positions locating the horizontal projector member at a different height above the first horizontal member;

first and second lateral support members located on a first and a second lateral sides of the horizontal projector member and the vertical projector member;

a plurality of spacers for separating the first and second lateral support members from the horizontal projector member and the vertical projector member; and a plurality of connectors for securing the first and second lateral support members with the horizontal projector member and the vertical projector member separated by the plurality of spacers; and a projector crossbar member slidably connected between the first and second mounting arms to which a projector is mounted, wherein the projector crossbar member slides between a plurality of positions, each of the plurality of positions a different distance from the viewing area, wherein the projector crossbar member further comprises:

a first bracket connected to a first end of the projector crossbar member and defining an opening for slidably receiving a first one of the horizontal projector members to enable the projector crossbar member to move along the horizontal crossbar member;

a second mounting bracket connected to a second end of the projector crossbar member and defining an opening for slidably receiving a second one of the horizontal projector members to enable the projector crossbar member to move along the horizontal crossbar member; and a plurality of securing mechanisms for locking the first end and the second end of the projector crossbar member into a fixed position on the horizontal projector members.

17. The portable projection screen system of claim 16, wherein the vertical projector member further includes identifiers located on a surface thereof, each identifier associated with one of a plurality of predetermined positions of the horizontal projector member above the first horizontal member.

18. The portable projection screen system of claim 16, wherein horizontal projector member further includes second identifiers located on a surface thereof, each second identifier associated with a position of the projector crossbar member at a predetermined distance from the viewing area.

19. The portable projection screen system of claim 16 further including a screen canopy connected to the projector mounting assembly for shielding the viewing area form ambient light.

20. The portable projection screen system of claim 19, wherein the screen canopy further includes:

a plurality of interconnecting members defining a support frame; and a fabric cover connectable to and supported by the support frame.

21. The portable projection screen system of claim 16 further including a pair of removable screen wings to increase the width of the viewing area, wherein the pair of removable screen wings connect to the first and second vertical members.

22. The portable projection screen system of claim 16 further including:

a plurality of snaps located around the viewing area on the first and second vertical members and the first and second horizontal members;

a plurality of spacers, each associated with one of the plurality of snaps for raising the level of the snap; and a viewing screen disposed over said viewing area and secured via the plurality of snaps.

23. The portable projection screen system of claim 22 further including a foam board that covers the entire viewing area and rests on the first and second vertical members and the first and second horizontal members, wherein the foam board defines a plurality openings through which the plurality of snaps may pass to engage the viewing screen.

24. The portable projection screen system of claim 16 further including:

at least one base member pivotally connected to a base end of each of the first and second vertical members, the at least one base member pivoting between a first position parallel to the first or second vertical member and a second position perpendicular to the first or second vertical member;

a ratchet pulley connected at top end of one of the vertical members;

a tension line having a first end connected to one of the at least one base member that passes through the ratchet pulley and has a free second end; and wherein by pulling on the free second end a tension between the first end of the line and the ratchet pulley can be increased to counter act a weight placed on the projector crossbar member.

25. The portable projection screen system of claim 16 further including:
at least one base member pivotally connected to a base end of each of the first and second vertical members, the at least one base member pivoting between a first position parallel to the first or second vertical member and a second position perpendicular to the first or second vertical member;
an adjustable foot extender, the adjustable foot extender further comprising:
- a pair of side plates for pivotally connecting to lateral sides of the at least one base member;
- a stability plate connected between the pair of side plates and extending outward from the at least one base member to stabilize the portable projection screen system, wherein the stability plate may pivot from positions both above and below a central axis of the at least one base member;
- a securing arm extending from a top surface of the at least one base member and including a threaded opening;
- a securing bolt within the threaded opening that when rotated in a first direction a first end of the securing bolt engages the stability plate to pivot the stability plate below the central axis of the at least one base member and when rotated in a second direction enables the stability plate to pivot above the central axis of the at least one base member.

26. A portable projection screen system, comprising:
a first vertical member including at least one hinged point for folding the first vertical member into at least two separate portions;
a second vertical member including at least one hinged point for folding the second vertical member into at least two separate portions, the second vertical member disposed parallel to the first vertical member and having substantially the same length as the first vertical member;
a first horizontal member disposed perpendicular to and pivotally connected with the first and second vertical members including at least one hinged point for folding the upper horizontal member into at least two separate portions;
a second horizontal member disposed perpendicularly and pivotally connected with the first and second vertical member including at least one hinged point for folding the second horizontal member into at least two separate portions and located below the first horizontal member to define a viewing area bounded by the first and second vertical members and the first and second horizontal members;
a projector mounting assembly comprising:
a first and second mounting arms spaced a selected distance apart, each of the first and second mounting arms including a horizontal projector member located above the first horizontal member and extending forward of the viewing area and a vertical projector member pivotally connected perpendicular to the horizontal projector member, wherein the vertical projector member connects to a backside of the viewing area in a plurality of positions, each of the plurality of positions locating the horizontal projector member at a different height above the first horizontal member;
first and second lateral support members located on a first and a second lateral sides of the horizontal projector member and the vertical projector member;
a plurality of spacers for separating the first and second lateral support members from the horizontal projector member and the vertical projector member; and
a plurality of connectors for securing the first and second lateral support members with the horizontal projector member and the vertical projector member separated by the plurality of spacers; and
a projector crossbar member slidably connected between the first and second mounting arms to which a projector is mounted, wherein the projector crossbar member slides between a plurality of positions, each of the plurality of positions a different distance from the viewing area;
at least one base member pivotally connected to a base end of each of the first and second vertical members, the at least one base member pivoting between a first position parallel to the first or second vertical member and a second position perpendicular to the first or second vertical member;
an adjustable foot extender, the adjustable foot extender further comprising:
- a pair of side plates for pivotally connecting to lateral sides of the at least one base member;
- a stability plate connected between the pair of side plates and extending outward from the at least one base member to stabilize the portable projection screen system, wherein the stability plate may pivot from positions both above and below a central axis of the at least one base member;
- a securing arm extending from a top surface of the at least one base member and including a threaded opening;
- a securing bolt within the threaded opening that when rotated in a first direction a first end of the securing bolt engages the stability plate to pivot the stability plate below the central axis of the at least one base member and when rotated in a second direction enables the stability plate to pivot above the central axis of the at least one base member.

\* \* \* \* \*